United States Patent [19]

Filgas, Jr. et al.

[11] 4,358,712

[45] Nov. 9, 1982

[54] DISCHARGE LAMP BALLAST

[75] Inventors: Ludovic S. Filgas, Jr., Berkeley; Haakon T. Magnussen, Jr., Pinole, both of Calif.

[73] Assignee: Altex Scientific, Inc., Berkeley, Calif.

[21] Appl. No.: 221,095

[22] Filed: Dec. 29, 1980

[51] Int. Cl.³ .............................................. H05B 37/00
[52] U.S. Cl. .................................. 315/243; 315/244; 315/DIG. 7
[58] Field of Search .................. 315/243, 244, DIG. 7

[56] References Cited

U.S. PATENT DOCUMENTS

| | | | |
|---|---|---|---|
| 2,301,891 | 11/1942 | Lecorguillier | 315/244 |
| 2,659,037 | 11/1953 | Claude | 315/243 |
| 3,753,037 | 8/1973 | Kaneda et al. | 315/243 |
| 4,060,752 | 11/1977 | Walker | 315/DIG. 7 |

Primary Examiner—Harold A. Dixon
Attorney, Agent, or Firm—R. J. Steinmeyer; R. R. Meads

[57] ABSTRACT

Circuit for starting and operating a gas discharge lamp. The circuit includes a resonant circuit having a high Q during both starting and operating conditions of the lamp, thereby permitting a high lamp operating voltage to be obtained from a relatively low voltage power supply. The circuit comprises a power supply, an inductor-capacitor series-resonant circuit connected across the power supply terminals, and a lamp circuit connected in parallel with the capacitor of the series-resonant circuit, wherein the lamp circuit comprises a second capacitor connected in series with a gas discharge lamp.

4 Claims, 7 Drawing Figures

DISCHARGE LAMP BALLAST

BACKGROUND OF THE INVENTION

1. Field of the Invention

The present invention relates to series-resonant ballast circuits for gas discharge lamps.

2. Description of the Prior Art

A gas discharge lamp in the off condition is essentially an open circuit and requires a high voltage across its terminals to ionize or ignite the lamp. After the lamp is ignited, its effective resistance drops to a finite value, and its operating voltage drops to a fraction of the starting voltage. Because the lamp's effective resistance is a decreasing function of the RMS lamp current, some ballast impedance must be provided in series with the lamp to limit the lamp current.

A ballast circuit for operating an electric discharge lamp in accordance with the above requirements is disclosed in U.S. Pat. No. 4,053,813 to Kornrumpf et al. and U.S. Pat. No. 4,069,751 to Anderson. The disclosed ballast circuit comprises an inductor connected in series between the lamp and an AC power supply, and a capacitor connected in parallel with the lamp. The inductor and capacitor resonate at the power supply frequency or a harmonic thereof. When the lamp is off, the resonant circuit Q is high, and the lamp receives a high starting voltage proportional to the product of the Q and the power supply voltage. When the lamp ionizes or ignites, its effective resistance drops, thereby lowering the resonant circuit Q and causing the lamp voltage to drop to a lower operating value. The impedance of the series inductor exceeds the incremental negative resistance of the lamp and therefore limits the lamp current, as desired.

One disadvantage of the prior art ballast circuit as described in the cited patents is that the circuit Q is very low during lamp operation. The low Q implies that no substantial voltage step-up occurs, so that the power supply must supply a voltage comparable to the lamp operating voltage. If the lamp is of the type requiring an operating voltage of over 100 volts, then the power supply requires expensive high voltage transistors, or else may operate at a lower voltage and supply the lamp through a step-up transformer. Either the high voltage transistors or the step-up transformer undesirably increases the cost of the power supply.

SUMMARY OF THE INVENTION

The present invention is a circuit for starting and operating a gas discharge lamp. The circuit comprises a resonant circuit which may be optimized so as to have a higher Q when the lamp is operating than prior art designs, thereby permitting a high lamp operating voltage to be obtained from a relatively low voltage power supply without using a step-up transformer.

More specifically, the circuit according to the present invention comprises a power supply, an inductor-capacitor series-resonant circuit connected across the power supply terminals, and a lamp circuit connected in parallel with the capacitor of the series-resonant circuit, wherein the lamp circuit comprises a second capacitor connected in series with a gas discharge lamp.

DETAILED DESCRIPTION OF THE PREFERRED EMBODIMENT

Theory of Operation

Figure 1:
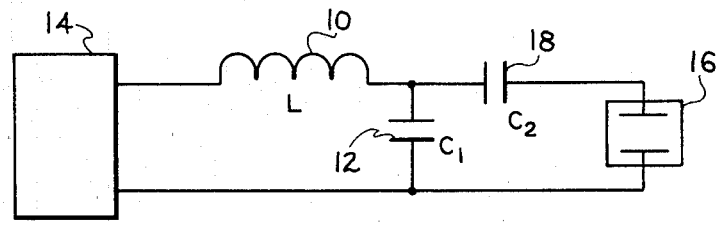
FIG. 1 is an electrical schematic diagram of a circuit for starting and operating a gas discharge lamp according to the present invention.

As shown in FIG. 1, the present invention comprises an inductor 10 having inductance value L and a first capacitor 12 having capacitance value $C_1$ connected in series across the output of an AC power supply 14. The gas discharge lamp 16 is connected in series with a second capacitor 18 having capacitance value $C_2$, and the resulting series combination is connected in parallel with the first capacitor 12.

Before lamp 16 is ignited, its impedance is so much higher than that of the other components of the circuit that it can be considered an open circuit. Thus, power supply 14 is essentially driving a series-resonant circuit consisting of inductor 10 and first capacitor 12. Power supply 14 produces an alternating output voltage preferably having a substantial frequency component at the resonant frequency of the series-resonant circuit. More preferably, the power supply output voltage is a square wave whose frequency equals the resonant frequency of inductor 10 and capacitor 12.

Figure 2:
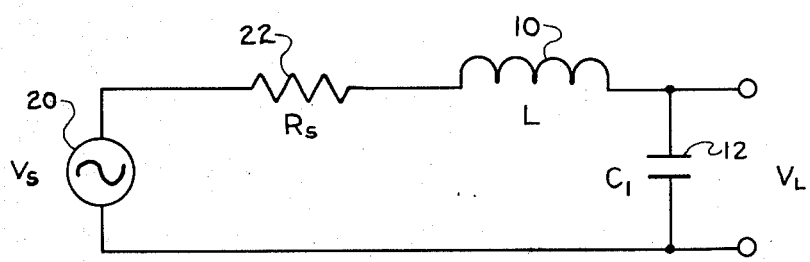
FIG. 2 is a schematic diagram of a circuit model equivalent to the circuit of FIG. 1 before the lamp is ignited.

FIG. 2 shows a circuit model equivalent to the lamp circuit of FIG. 1 before lamp 16 is ignited. Power supply 14 is modeled by a sinusoidal voltage source 20 whose voltage $V_s$ and frequency $f_o$ will be explained below. Lamp 16 and the second capacitor 18 are omitted from the model because the lamp is essentially an open circuit. The lamp voltage, represented by the symbol $V_L$, essentially equals the voltage across the first capacitor 12. A resistor 22 having a value $R_s$ appears in the model in series with inductor 10. The resistor represents all the resistive losses in the circuit, including the series resistance of inductor 10, dielectric losses in first capacitor 12, and the output impedance of power supply 14.

The resonant frequency $f_o = 1/2\pi\sqrt{LC_1}$ of the circuit of FIG. 2 is the frequency at which the reactance $1/(2\pi f_o C_1)$ of the first capacitor 12 and the reactance $2\pi f_o L$ of inductor 10 are of equal magnitude. The circuit Q is the ratio of such reactance at the resonant frequency to the resistance $R_s$. Assuming the Q is much greater than one, the lamp voltage $V_L$ is essentially a sine wave at the resonant frequency $f_o$ whose value equals the product of the Q and the value $V_s$ of the sinusoidal component at frequency $f_o$ of the square-wave output voltage of power supply 14. This is summarized in equation (1) as follows:

$$V_L/V_s = Q = 2\pi f_o L/R_s = 1/(2\pi f_o C R_s) \tag{1}$$

It has been found practical to obtain inductors and capacitors with low enough losses to attain a Q of 200 or more. This means that a voltage $V_L$ is available to fire lamp 16 equal to 200 times the sinusoidal voltage $V_s$ from power supply 14. More precise calculations will be presented in a subsequent discussion of a practical example.

Figure 3:
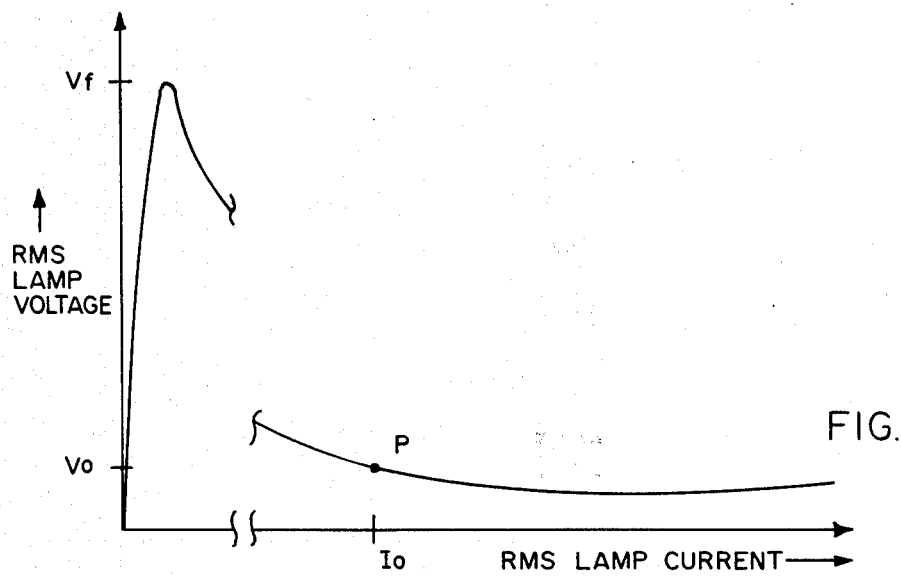
FIG. 3 is a graph showing the RMS voltage-current characteristic curve of a typical gas discharge lamp.

Shortly after a high voltage is applied to lamp 16 as just discussed, the lamp ignites and emits light. When the lamp ignites, its effective resistance drops to a value of typically a few thousand ohms. FIG. 3 shows the RMS voltage-current characteristic curve of a typical gas discharge lamp whose firing voltage is denoted $V_f$. Various current regulating means are known for regulating the lamp current and thereby establishing the operating point of the lamp on its characteristic curve. For example, if the lamp current is regulated at a value $I_o$, then its operating point will be the point P shown in FIG. 3 and the voltage drop across the lamp will be $V_o$. The effective resistance of the lamp at that operating point is defined as $V_o/I_o$. Note that the effective resistance of the lamp is always positive, whereas its incremental resistance, which is the slope of the characteristic curve, is negative throughout the lamp's normal range of operating current.

Figure 4:
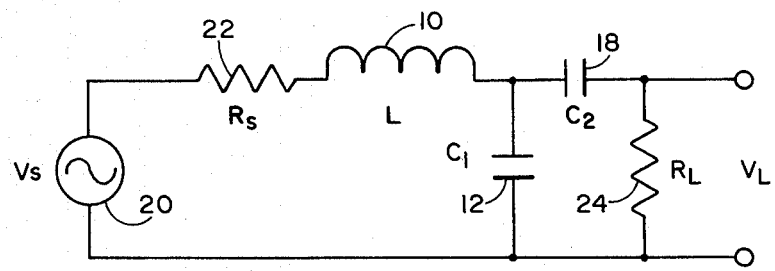
FIG. 4 is a schematic diagram of a circuit model equivalent to the circuit of FIG. 1 while the lamp is operating.

FIG. 4 shows a circuit model equivalent to the lamp circuit of FIG. 1 during normal operation of the lamp, i.e., while lamp 16 is ignited and emitting light. Lamp 16 is modeled by a resistor 24 whose value $R_L$ equals the effective resistance of the lamp at the operating point established by the regulating means. As in FIG. 2, power supply 14 is modeled by a sinusoidal voltage source 20 whose frequency is the resonant frequency $f_o \cong 1/[2\pi \sqrt{L(C_1+C_2)}]$ of the circuit shown in FIG. 4 and whose voltage $V_s$ is the component of the power supply output voltage at that frequency. For reasons explained below, the value $C_2$ of capacitor 18 is in practice much smaller than the value $C_1$ of capacitor 12, so that the circuits of FIGS. 2 and 4 have substantially equal resonant frequencies.

The circuit model of FIG. 4 is a variation of the known "capacitor divider" or "capacitor transformer" circuit. At its resonant frequency, its operation is the same as that of the circuit model shown in FIG. 5a wherein inductor 10 and capacitors 12 and 18 are replaced by a step-up transformer 26 whose turns ratio equals $(C_1+C_2)/C_2$. This circuit model may be further simplified to the circuit model shown in FIG. 5b wherein the transformer 26 is eliminated, resistor 22 is replaced by a resistor 22a whose value is $R_s[(C_1+C_2)/C_2]^2$, and voltage source 20 is replaced by a source 20a whose voltage is $V_s(C_1+C_2)/C_2$.

From the circuit model shown in FIG. 5b, it is apparent that when lamp 16 is operating, the ratio of the voltage $V_L$ to the power supply voltage $V_s$ is as follows:

$$V_L/V_s = R_L[(C_1+C_2)/C_2]/[R_L+R_s(C_1+C_2)^2/(C_2)^2] \tag{2}$$

Figure 5A:
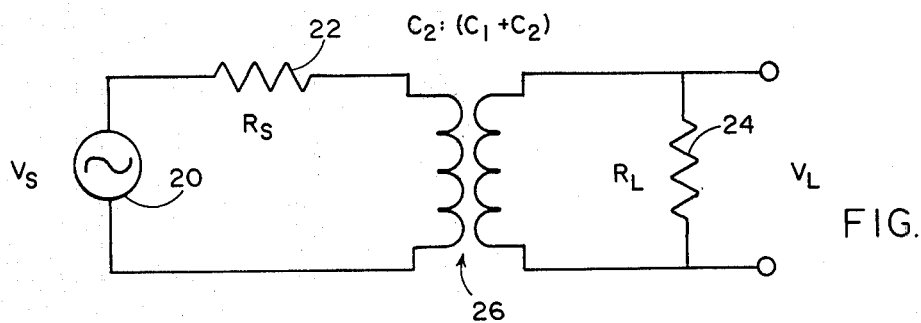
FIG. 5a is a schematic diagram of a circuit model equivalent to the circuit of FIG. 4 wherein a transformer replaces the inductor and two capacitors of FIG. 4.
Figure 5B:
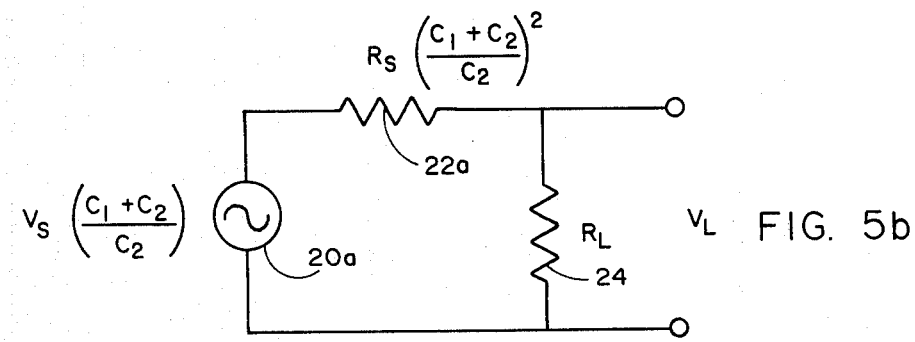
FIG. 5b is a schematic diagram of a circuit model equivalent to the circuit of FIG. 5a but eliminating the transformer thereof.

From the circuit model shown in FIG. 5a, it can be seen that the voltage ratio $V_L/V_s$ can be maximized by establishing the value of $C_2$ so that transformer 26 matches the load resistance $R_L$ with the source resistance $R_s$. This is accomplished by establishing the value $C_2$ of capacitor 18 so that the following equation is satisfied:

$$C_2/(C_1+C_2) = \sqrt{R_s/R_L} \tag{3}$$

The value of $C_2$ that satisfies equation (3) is:

$$C_2 = C_1/\left(\sqrt{R_L/R_s} - 1\right) \tag{4}$$

In practical high Q circuits, $R_s$ is much smaller than $R_L$, and hence equation (4) may be approximated as follows:

$$C_2 = C_1\sqrt{R_s/R_L} \tag{5}$$

If the value of $C_2$ is established according to Equation (4) or (5), then the voltage ratio $V_L/V_S$ will be maximized and will have the following value:

$$V_L/V_S = \tfrac{1}{2}\sqrt{R_L/R_s} \tag{6}$$

DESIGN EXAMPLE

A practical design example will now be presented to illustrate the application of the foregoing theory and to demonstrate the present invention's advantages over the prior art. In particular, the design example will demonstrate that the present invention enables the use of a lower voltage power supply than prior art designs, thereby eliminating any need for expensive high voltage transistors or step-up transformers.

The design example is based on the preferred embodiment of the present invention shown in FIG. 1. In the design example, gas discharge lamp 16 is a zinc vapor lamp which is to be powered by a 50 kHz sinusoidal voltage. At 50 kHz, the illustrative zinc vapor lamp requires a starting voltage of 1,800 volts RMS. After ignition, the chosen operating point for the lamp will be an RMS lamp voltage and current of 110 volts and 45 milliamperes, respectively. The lamp starting and operating voltages will be obtained from a power supply 14 which outputs a 25 volt peak-to-peak square wave having a frequency of 50 kHz.

The first step in the design is to select values for inductor 10 and first capacitor 12 so as to obtain the required 1,800 volt RMS lamp starting voltage. As explained earlier, lamp 16 is essentially an open circuit before it is ignited, so that the actual circuit shown in FIG. 1 is equivalent to the circuit model shown in FIG. 2 which omits lamp 16 and second capacitor 18.

Since the design specifies the lamp is to be powered by a 50 kHz sinusoidal voltage, inductor 10 and first capacitor 12 must have respective values L and $C_1$ chosen to resonant at 50 kHz. In other words, their values must satisfy the equation:

$$1/\left(2\pi\sqrt{LC_1}\right) = 50 \text{ kHz} \qquad (7)$$

In addition, the resonant circuit Q must be high enough to obtain the 1,800 volt RMS lamp starting voltage $V_L$ from the 25 volt peak-to-peak square wave furnished by the power supply. The amplitude $V_S$ of the sinusoidal component of the square wave at its 50 kHz fundamental frequency is 11.3 volts RMS. Referring to Equation (1), the resonant circuit Q must be at least $1,800/11.3 = 160$.

As stated in the paragraph preceding Equation (1), the resonant circuit Q is the ratio of the reactance of inductor 10 or capacitor 12 at the resonant frequency $f_o = 50$ kHz to the resistance $R_s$ of resistor 22 shown in FIG. 2. Resistor 22 was defined as the equivalent series resistor used to model all the resistive losses in the actual components of the circuit, including the series resistance of inductor 10, dielective losses in capacitor 12, and the output impedence of power supply 14. In the design example, resistor 22 will be assumed to have a value of 6 ohms, this being considered the lowest value of resistive loss attainable in practical circuits. To obtain the required Q of at least 160, the reactance at resonance of inductor 10 and capacitor 12 must therefore be at least 160 (6 ohms) = 960 ohms. The value $C_1$ of capacitor 12 having this reactance at 50 kHz is $C_1 = 1/[2\pi(50 \text{ kHz}) (960 \text{ ohms})] = 3,300$ pf. The value L of inductor 10 that resonates at 50 kHz with such a capacitor is, from Equation (7), $L = 3$ mH.

If the circuit of FIG. 1 is constructed with inductor 10 and first capacitor 12 having the values determined above, then the circuit will supply the required 1,800 volt RMS starting voltage to lamp 16.

The next step in the design is to determine the value $C_2$ of the second capacitor 18 which maximizes the voltage supplied to the lamp during normal operation, i.e., after the lamp has been started or ignited. According to Equation (5), the capacitance value $C_2$ is a function of the effective resistance $R_L$ of lamp 16 at its chosen operating point. Since the operating point was specified as a lamp voltage and current of 110 volts RMS and 45 ma RMS, respectively, the effective resistance $R_L$ of the lamp is 110 v/45 ma = 2,440 ohms. Applying the previously determined values of $C_1$ and $R_s$ to Equation (5), the optimum value of second capacitor 18 is $C_2 = 3,300$ pf $\sqrt{6/2,440} = 165$ pf.

If the second capacitor has the value just determined, then the voltage ratio $V_L/V_S$ will have the value indicated by Equation (6), which equals 10. It was shown earlier that the voltage value $V_S$ of the 50 kHz sinusoidal component of the output voltage from power supply 14 is 11.3 volts RMS. Since the voltage ratio $V_L/V_S$ equals 10, then 113 volts RMS is available to operate lamp 16. This is slightly more than enough voltage, since the desired operating point for lamp 16 was specified as 110 volts RMS.

As stated in the earlier discussion of FIG. 3, various regulating means are known for regulating the lamp current and thereby establishing the operating point of lamp 16. In the preferred embodiment, a small value resistor is placed in series with lamp 16 to sense the lamp current. A feedback circuit regulates the output power delivered by power supply 14 so that the sensed lamp current maintains the desired value of 45 ma.

The preferred method of regulating the power delivered to lamp 16 by power supply 14 is to regulate the duty cycle, rather than the peak-to-peak amplitude, of the square-wave output voltage of the power supply. The 11.3 volt RMS value given above for the 50 kHz sinusoidal component of the power supply output was based on the square wave's having a 50% duty cycle. Decreasing the duty cycle would decrease the value $V_S$ of the 50 kHz component of the square wave, thereby decreasing the lamp operating voltage $V_L$ proportionately in accordance with Equation (6). Therefore, the lamp voltage and current can be regulated by regulating the duty cycle of the square wave voltage produced by power supply 14.

In the design example, 113 volts RMS would be supplied to the lamp if the duty cycle of the power supply output were 50%. Power supply 14 would preferably comprise regulating means for reducing the duty cycle somewhat to reduce the lamp operating voltage to the desired value of 110 volts RMS.

The present invention may be applied to operate gas discharge lamps used as light sources in analytical instruments such as spectrophotometers and liquid chromatographs. Many such instruments include switching means for allowing the user to select the light source from a variety of gas discharge lamps having different spectral characteristics. For example, the selection may include mercury vapor and cadmium vapor lamps as well as the zinc vapor lamp discussed above. Such lamps require different operating points and have different effective resistances.

From Equation (5), the optimum value of the second capacitor 18 for a given lamp would depend on the effective resistance of that lamp at its chosen operating point. Since capacitor 18 is in series with the lamp, each lamp may be readily provided with its own capacitor 18 having a value optimized for that lamp, and the switching means for selecting which lamp is connected to the ballast circuit can simultaneously select the capacitor 18 corresponding to that lamp.

Comparison With Prior Art

Figure 6:
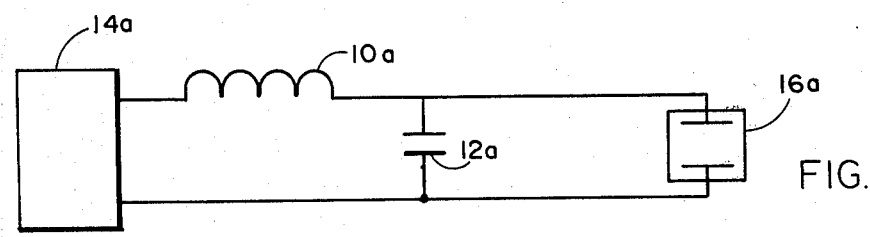
FIG. 6 is an electrical schematic diagram of a prior art circuit for starting and operating a gas discharge lamp.

The U.S. patents cited in the Background of the Invention each disclose a ballast circuit as shown in FIG. 6 comprising a power supply 14a, an inductor 10a, a capacitor 12a, and a lamp 16a respectively interconnected in the same manner as the corresponding elements 14, 10, 12 and 16 in FIG. 1. However, the prior art lacks any capacitor comparable to the second capacitor 18 shown in FIG. 1.

It has just been demonstrated that, by proper choice of inductor and capacitor values, the circuit according to the present invention shown in FIG. 1 can start and operate a zinc vapor lamp 16 using a power supply 14 having a square-wave output voltage of only 25 volts peak-to-peak. It will now be demonstrated that the prior art circuit shown in FIG. 6 cannot supply the specified starting and operating voltages to such a lamp using such a low voltage power supply.

For the purposes of the present comparison, gas discharge lamp 16a in the prior art circuit shown in FIG. 6 will be assumed to have the same characteristics as the zinc vapor lamp 16 specified in the previous design example. Power supply 14a will be assumed to provide the same output voltage as in the design example, i.e., a 25 volt peak-to-peak square wave.

Before lamp 16a is ignited, the prior art circuit of FIG. 6 behaves identically to Applicant's circuit of FIG. 1 because lamp 16a is effectively an open circuit, making the absence of a second capacitor in series with the lamp irrelevant. Therefore, the criteria for selecting values for inductor 10a and capacitor 12a to obtain the required starting voltage are the same as in the previous design example. In particular, at the 50 kHz resonant frequency the reactance of inductor 10a and capacitor 12a must be at least 960 ohms. Increasing the value of such reactance above 960 ohms will increase the circuit Q and the starting voltge above the minimum values required to ignite the lamp 16a.

After lamp 16a is ignited and begins normal operation, its effective resistance drops to a finite value. The effective resistance was specified as 2,440 ohms for the operating point chosen in the design example. During such operation, the absence of a second capacitor in series with lamp 16a is quite significant. In constrast with the present invention, the prior art circuit does not perform in accordance with the transformer model of FIG. 5a and does not satisfy Equations (2) and (6).

Instead, during operation lamp 16a behaves as a resistive load connected directly in parallel with capacitor 12. The effect of such a load is to lower the circuit Q to a value approximately equal to the ratio of the effective resistance of lamp 16a to the reactance of capacitor 12a at the resonant frequency. Since the capacitive reactance was required to be at least 960 ohms to obtain the required starting voltage, the circuit Q during operation can be no greater than Q=2,440/960=2.5. The resulting voltage provided across lamp 16a approximately equals the product of the Q of 2.5 and the 11.3 volts RMS amplitude of the 50 kHz component of the output voltage from power supply 14a. Therefore, the voltage provided to operate lamp 16a is only 2.5 (11.3 volts)=28 volts RMS, only about one-fourth the required operating voltage of 110 volts RMS.

The foregoing analysis of the prior art circuit of FIG. 6 demonstrates that if the values of inductor 10a and capacitor 12a are established as to obtain a high enough circuit Q to start lamp 16a, then the circuit Q after ignition will be inadequate to produce the required lamp operating voltage. Conversely, the circuit Q during lamp operation may be increased by decreasing the reactances of inductor 10a and capacitor 12a, but this will result in insufficient Q and voltage when starting the lamp.

In contrast, the circuit according to the present invention comprising second capacitor 18 can provide to the lamp the same starting voltage as the prior art circuit while providing a much greater operating voltage—in the example discussed, four times greater.

In conclusion, the present invention enables a lamp ballast circuit to have a high Q even while the lamp is operating. One advantage of such a high Q is that it reduces the power supply voltage required to start and operate the lamp, thereby avoiding in most cases any need for expensive high voltage transistors or step-up transformers. Another advantage of a high Q is that it results in an almost purely sinusoidal voltage being applied to the lamp, even if the power supply output is a square wave.

We claim:

1. Apparatus for starting and operating a gas discharge lamp comprising:
    power supply means for supplying an alternating voltage across two power supply terminals;
    a series-resonant circuit, connected across the two power supply terminals, comprising an inductor and a first capacitor connected in series; and
    a lamp circuit, connected in parallel with the first capacitor, comprising a second capacitor connected in series with a gas discharge lamp, the second capacitor having a substantially smaller capacitance than the first capacitor.

2. Apparatus according to claim 1 wherein the second capacitor has a capacitance substantially equal to the value of the mathematical expression $$C_1 / \left( \sqrt{R_L/R_s} - 1 \right)$$

wherein $C_1$ denotes the capacitance of the first capacitor, $R_L$ denotes the effective resistance of the lamp when it is operating, and $R_s$ denotes the resistance of the series-resonant circuit at its resonant frequency.

3. Apparatus according to claim 2, further comprising:
    a plurality of lamp circuits, each lamp circuit comprising a capacitor connected in series with a gas discharge lamp; and
    switching means for selectably connecting one of the lamp circuits in parallel with the first capacitor.

4. Apparatus according to claim 3 wherein the capacitor in each lamp circuit has a capacitance substantially equal to the value of the mathematical expression $$C_1 / \left( \sqrt{R_L/R_s} - 1 \right)$$

wherein $C_1$ denotes the capacitance of the first capacitor, $R_L$ denotes the effective resistance of the lamp in that lamp circuit when it is operating, and $R_S$ denotes the resistance of the series-resonant circuit at its resonant frequency.

* * * * *